United States Patent Office 2,800,407
Patented July 23, 1957

2,800,407
CITRUS MOLASSES REFINING PROCESS

Harry A. Toulmin, Jr., Dayton, Ohio, assignor to The Commonwealth Engineering Company of Ohio, Dayton, Ohio, a corporation of Ohio Application May 20, 1952, Serial No. 288,812

4 Claims. (Cl. 99—6)

This invention relates to a method of processing citrus waste and, more particularly, to a process of refining citrus waste, unbound water and press liquor (from stock food plants manufacturing cattle food from citrus waste) for the production of citrus molasses so as to produce an improved molasses product and by-products of high purity, that otherwise lowered the quality, taste, color and appearance of the citrus molasses.

Citrus molasses has been produced heretofore by concentrating citrus press liquor, for example as obtained by liming chopped or otherwise macerated citrus waste such as peelings, pulp, etc. remaining from the processing of oranges, grapefruit, lemons, limes and the like citrus products. This waste is then lightly limed (.1 to .4%) and when the unbound water runs out, the residue is pressed and additional water is extracted from the waste prior to final drying.

The resultant unbound water and press liquor is a viscous, turbid, colored liquid containing from about 8 to 16 percent total dissolved solids, more than half of which is usually sugar.

In commercial molasses manufacture, such unbound water and press liquor is ordinarily delivered from waste fruit as unbound water and from the presses in a continuous stream. It is passed through a shaker screen to remove coarse particles and then is heated and flashed to de-oil and precipitate calcium and magnesium salts; thereafter, the liquor is introduced into multiple-effect evaporators where it is concentrated to produce citrus molasses by heat and vacuum.

Citrus molasses as prepared in accordance with prior methods has a number of disadvantages. Principal among these are the product is too dark in color due to the heat of caramelization of the sugar, too bitter, relatively low in sugar content, high in ash, and contains more water content than desirable. It is, therefore, used primarily to sweeten stock food, but usually only cows will eat it so its market is restricted. The dark, bitter molasses cannot be used for canning of orange and grapefruit or other uses as a bland, sweet-tasting citrus syrup.

Various attempts have been made and proposed for improving citrus molasses such as clarifying the citrus press liquor before sending to the multiple-effect evaporators by employing filtration and screening methods. These methods have resulted in no material improvement in the citrus molasses product. The product is still dark in color and the taste has not been substantially improved. The present invention provides an improved process for the production of citrus molasses wherein the above disadvantages are to a large extent eliminated and a molasses product having an improved taste and color provided.

As a principal object of this invention, there is provided a process for treating citrus press liquors so as to effect a substantial improvement in the color and taste of citrus molasses processed from citrus waste, wherein a molasses substantially free of peel oil and seed oils, and glucosides, for example, naringin, hesperitin, d-limonene, b-limonene, and the bitter flaverones is obtained. Valuable by-products are thus obtained that otherwise would be lost in the molasses and, also, lower its quality and usefulness.

As a result, a light colored, bland, sweet-tasting syrup of pleasing aroma is obtained for use in fortification of citrus products in factories and many other uses.

Another object and advantage of the present invention is to provide an improved citrus molasses process permitting low liming in making stock food and high liming of the citrus waste waters in order to recover a maximum yield of d-limonene.

Another object of the invention is to effect clarification of the press liquor by precipitation of the solids therefrom by using upwards of 2% d-limonene, such as recovered by a by-produc of the process by high liming, and "Step Freeze" treatment of the citrus waste waters.

Another object is to carry out the process so as to produce a citrus molasses of improved color and taste by avoiding high temperature, high vacuum, treament which results in caramelization of the sugars with its resultant discoloration of the citrus press liquor during concentration into molasses.

It is an object to dehydrate by a freezing process. This has produced an unexpected result of being able to handle the viscous water despite increasing viscosity with increasing reduction of temperature and, at the same time, to clarify and produce a syrup of much lighter color.

A further object is to provide an improved process for producing citrus molasses and relatively pure terpinene by-products such as hesperitin and naringin.

A further object is to provide a method of producing citrus molasses of improved color and taste and wherein the terpinenes, such as d-limonene and b-limonene, are removed, being recovered as by-products of high purity.

An object of the process is to recover from the molasses the flavorones by dissolution to remove their bitterness from the citrus molasses.

Still a further object is to provide a process of concentrating citrus liquor without the necessity of employing multiple evaporators with heat and vacuum by effecting dehydration of the press liquor employing a "Step Freeze" refining treatment.

Still a further object is to provide an improved process for producing citrus molasses and d-limonene and where concentration of the press liquor and d-limonene is effected by employing a flashing treatment followed by a freeze dehydration step to provide a more efficacious process for removing water and impurities to produce a more concentrated molasses product.

Generally speaking, it is my object to eliminate the citrus terpinenes from the molasses to remove any objectionable taste from them and to recover these terpinenes as valuable by-products.

Other objects and advantages will become more apparent as the description proceeds and as considered in connection with the accompanying drawings illustrating diagrammatically one manner of practicing the invention.

Figure 1:
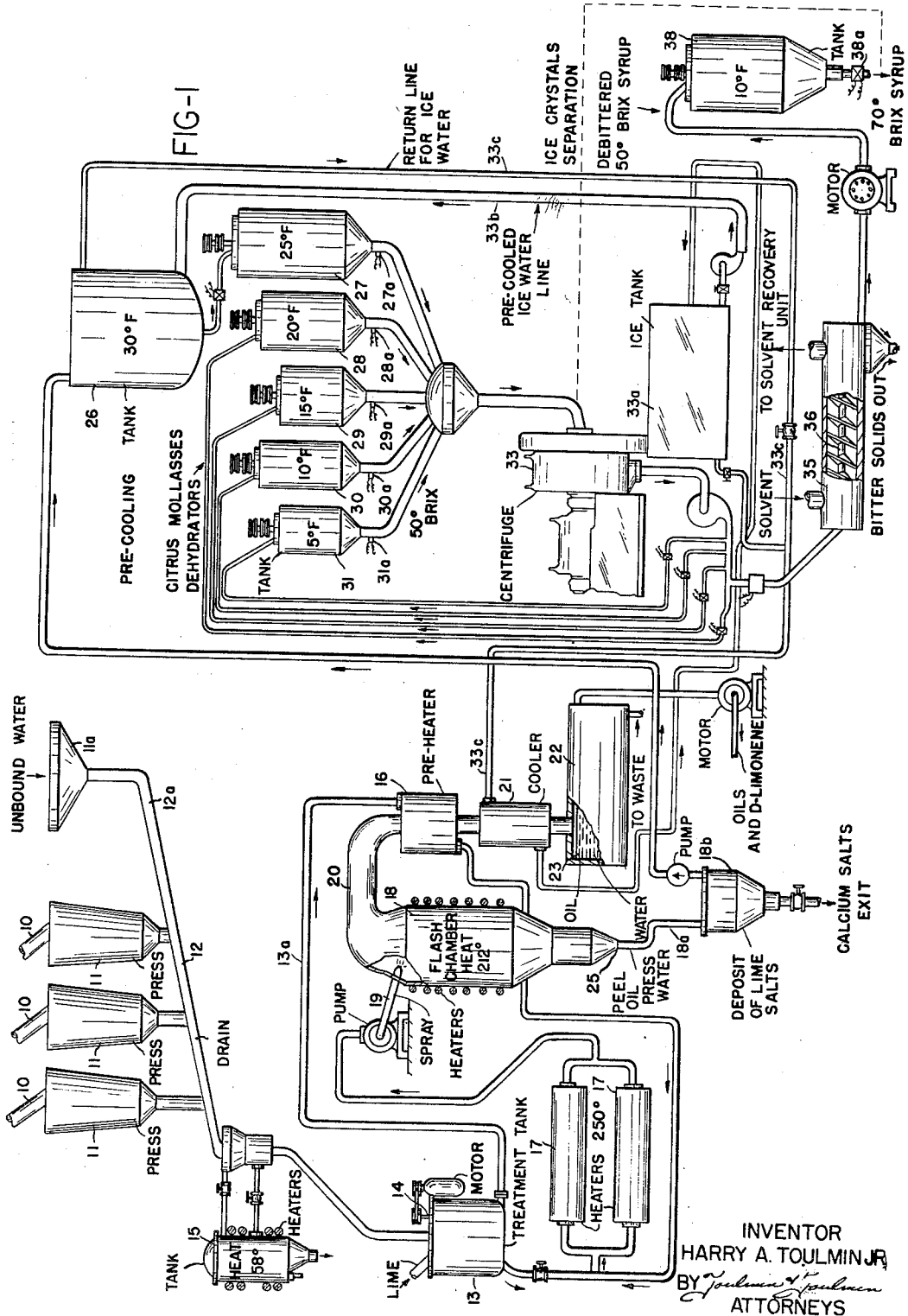
Figure 1 illustrates a typical plant for the practice of this invention.
Figure 2:
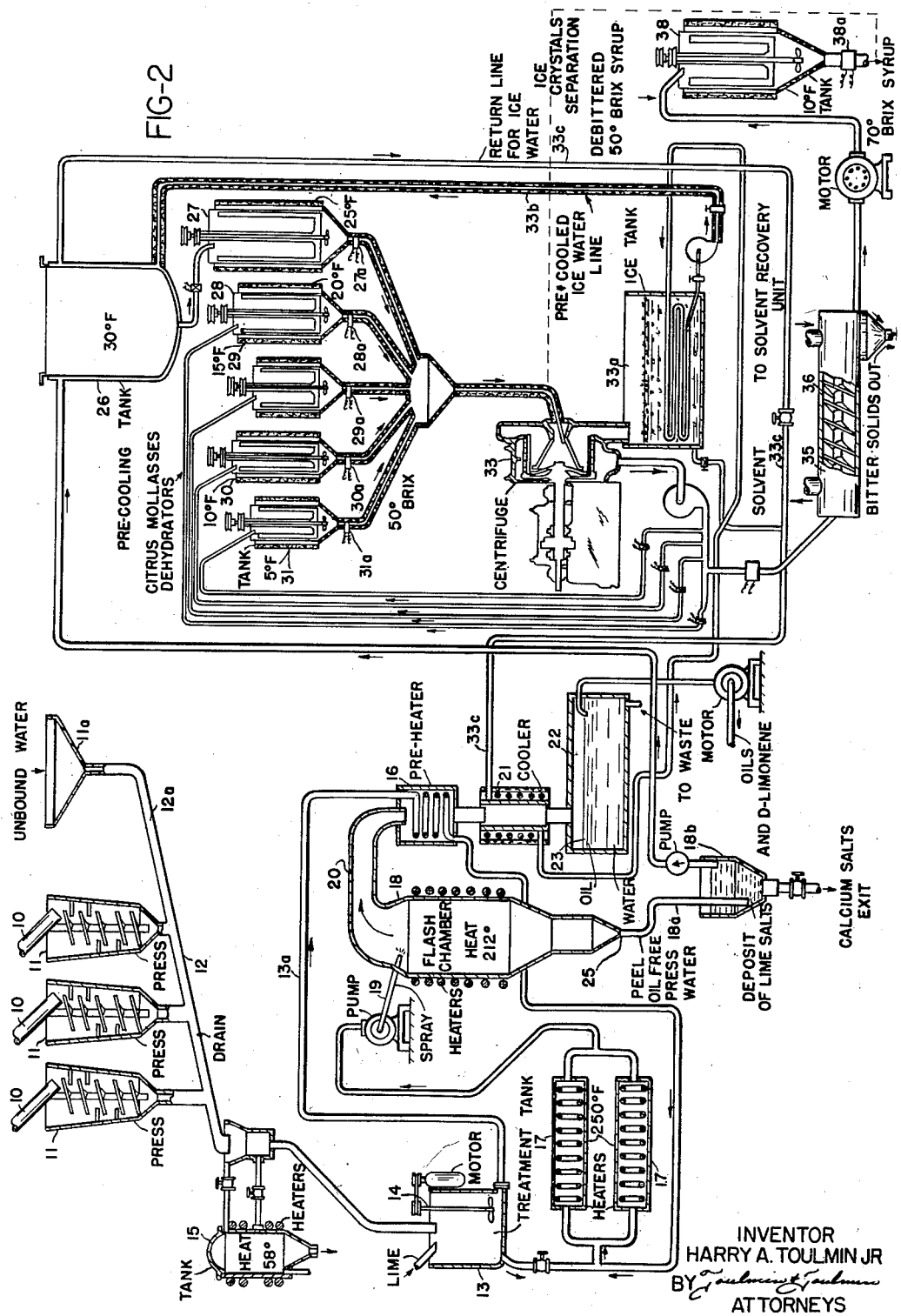
Figure 2 is a view similar to Figure 1 with the mechanism in section.
Figure 3:
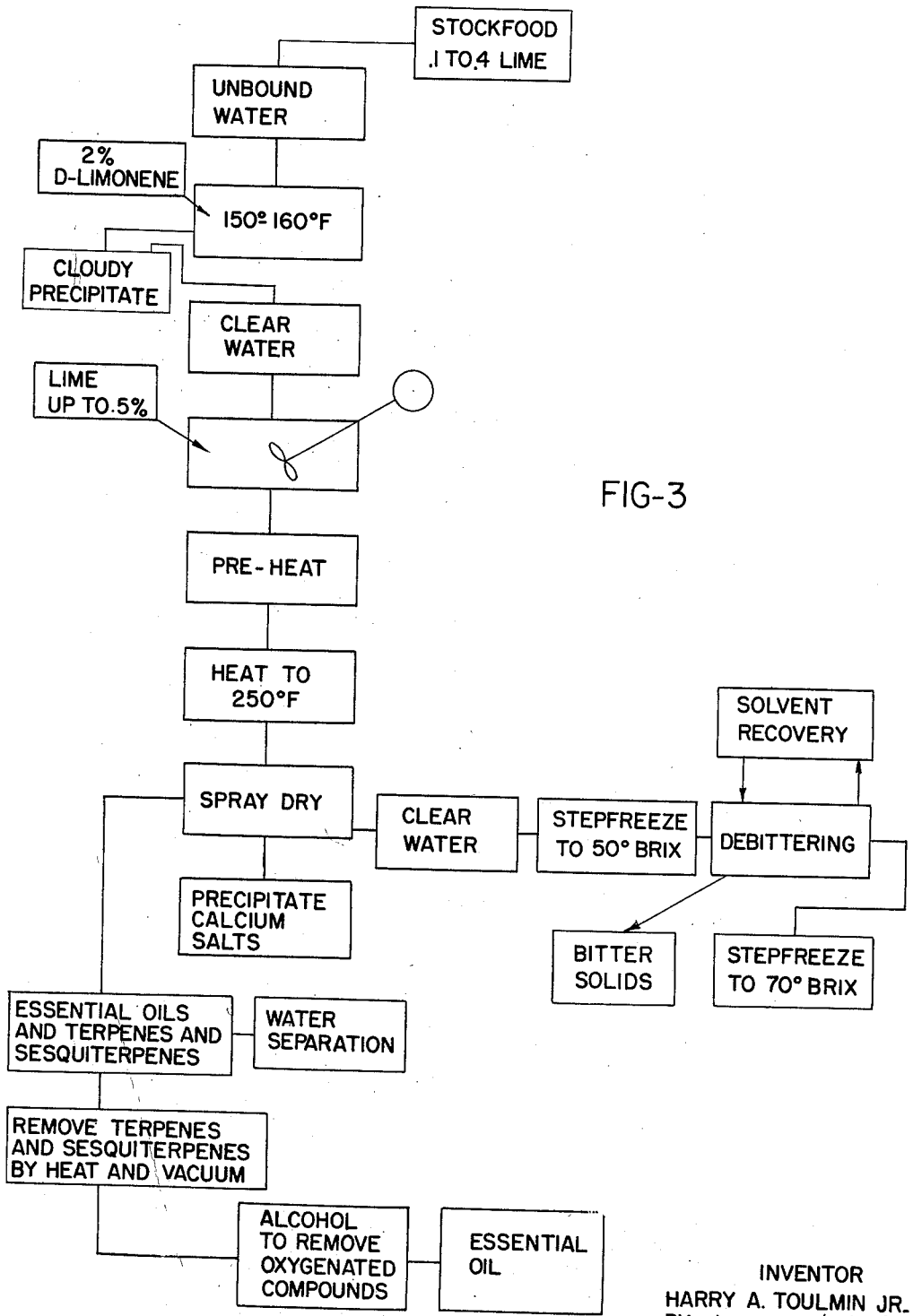
Figure 3 is a flow sheet of the process.

In accordance with the process of this invention, limed citrus material (from .1% to 5%), and designated 10 on the drawing, such as may be received from a stock food plant, is introduced into one or more mechanical presses, and such as illustrated diagrammatically at 11 and pressed to yield a press liquor of about 8° to 15° Brix. The liquor flowing from the presses 11, which are intermittently operated, are collected in the drain line 12.

The unbound water or liquor resulting from liming the waste fruit after maceration runs into the collector 11a and pipe 12a and drain pipe 12. The latter liquor frequently comprises the major portion of the water. It generally contains about 10 to 20 percent total solids of which about half or more is in the form of sugar. Lime from liming the fruit is in the water, but of insufficient amount to satisfactorily produce the maximum d-limonene. The liquor has a pH ranging from 5 to 7.

In this process, one of its advantages is that the user can reduce his liming in the stock food production to .1 to .3% to secure the most satisfactory results, and later add in this process a high lime additive to produce the maximum d-limonene.

The presses 11 are preferably operated continuously, one being unloaded while another is loaded, etc. They expel the citrus liquor from the citrus waste which is collected in a common drain 12 and conveyed to a tank 13 equipped with a stirrer 14. Additional lime or equivalent alkaline material, such as magnesia or the like, is added to produce an alkaline liquor. Utilizing lime as the alkali, the amount added preferably is from 0.5 to 1½ percent by weight, based on the weight of the original citrus waste mass, the pH of the resultant high limed mixture being about 8 to 10. This higher alkalinity of the citrus liquor enhances the yield of d-limonene recovered as a by-product, but is made possible because of the dehydration by freezing which eliminates the evil of high liming in a heat and evaporator installation, which causes trouble due to coating with lime scale in the evaporator tubes.

Where it is desired to effect flotation of the suspended solids in the press liquor, and which usually amounts to about 1 to 2 percent, the liquor may be drawn off to an auxiliary mixing tank 15 and treated by the addition of a suitable quantity of d-limonene, which is recovered as a by-product in the present process. Additions of upwards of 2 percent of d-limonene, by weight, to the press liquor and heating and mixing the material for 45 minutes at 160° F., approximately 85 percent by volume of the press liquor may be drawn off as a clear liquid. If large quantities of d-limonene are necessitated, the clarification step becomes too expensive.

After the liming treatment in tank 13, the resultant press liquor is conducted to the heat exchanger 17, where it is heated quickly to approximately 225° F.; a portion of the liquor from tank 13 being conducted to the pre-heater 16. The pre-heated liquor is then flashed into a vacuum chamber 18 by spraying the hot liquor into the upper part of the flash chamber 18 utilizing a spray nozzle 19. This also sterilizes the product. A suitable apparatus and method for carrying out this flashing treatment is described in the United States patent to Pulley 2,471,893. Where desired, the heated liquor may be subjected to a plurality of flashing treatments to increase the rate of settling and concentration of the liquor.

The flashing treatment serves to distill off the peel oil, which oil contains substantially all the d-limonene present. This peel oil is drawn out through a vapor line 20 and after passing the hot vapor through the heat exchanger 16 is condensed in a water cooled condenser 21 (the waste ice water from tank 33a may be used), the liquid condensate being collected in an oil-water separating tank 22. Since the essential oils with the d-limonene are of lower specific gravity than water, they separate out as a top layer 23 and may be drawn off.

To recover a substantially pure d-limonene, the condensate oil is preferably subjected to fractional distillation in vacuo. In this manner, there is recovered d-limonene having uniform characteristic properties which rotate in the plane of polarization in only one direction. Such a pure terpinene product is in demand for use in producing plastics, soaps, perfumes and in the paint industry. The peel oil also constitutes a valuable flavoring substance and penetrating oil.

A suitable method of freeze dehydration which is preferably employed is known commercially as "Step Freeze" and is described in United States Patent 2,559,205 and other patents.

The citrus liquor, substantially free of all essential oils and the terpenes and d-limonene, is withdrawn from the flash vacuum chamber 18, as at 25. This consists of a concentrate containing calcium citrate and other calcium organic salts with inverted solubilities which tend to precipitate other suspended matter. By permitting this liquor from pipe 18a to settle, as in tank 18b, for collection of the salts, the salt free liquor is then pumped to the "Step Freeze" apparatus.

This liquor is then subjected to freeze dehydration by conveying the same to a holding tank 26, which is arranged to be cooled to maintain the liquor at a temperature of about 30° F. From the holding tank 26, the liquor is subjected to step-by-step temperature graduation through tanks 27, 28, 29, 30 and 31. The discharge of refrigerated liquor for each successive stage of treatment through the tanks 27 as carried out in 31 is controlled by valves 27a, 28a, 29a, 30a and 31a respectively, and the refrigerant for each successive tank has a differential temperature of approximately 5° F., between the successive tanks and about a 5° differential between the material in the container of each tank and its refrigerant, the last tank 31 being at a temperature of 5° F. Constant agitation is used in each tank in association with the freezing medium.

The material subjected to refrigeration in each of tanks 26, 27, 28, 29, 30 and 31 is connected for discharge to a common centrifuge 33, suitable valves and pumps being utilized so that the liquor concentrate can be delivered to its respective tank. A sufficient freezing period time is allowed in each tank in order to produce a new crop of water crystals, the liquor being maintained in each tank only long enough to lower the freezing point of the solution to approximately the temperature of the refrigerant maintained in the tank to refrigerate the same. In this way, a final product is recovered from tank 31 having a concentration of about 40° to 60° Brix. These successive freezing treatments remove water and insolubles remaining in suspension and concentrates the citrus liquor to the desired Brix value. Such a method of treating liquid substances is illustrated and described in the United States Patent 2,559,205 as aforementioned known as "Step Freeze."

Following the "Step Freeze" treatment of the citrus press liquor, the material is subjected to solvent-extraction, wherein the liquor is washed with one or more organic solvents to remove undesirable glucosides such as the flavorones, hesperidin and naringin which give the molasses a bitter taste. The equipment used may consist of a multiple-effect kettle or elongated tube wherein the material is moved slowly therethrough, such as illustrated at 35 as by means of internal screw conveyors 36. The solvent is moved countercurrently to the liquor as indicated by the arrows so as to come into intimate contact with all portions of the liquor.

The organic solvents employed separately or in combination are compatible with water and dissolve the bitter tasting glucosides and flavanones present, thus removing them from the syrup. Such glucosides can then be recovered from the solvents. Such solvents comprise the higher alcohols, for example, butyl alcohol, isopropyl alcohol and ketones, such as acetone, butyrone and the like. After extracting the undesirable constituents, the resultant solvent mixture may be heated to vaporize the solvent which may be then condensed and thus recovered for re-use. The solvent treatment may precede the "Step Freeze" process.

The de-bittered citrus liquor is then conveyed, optionally to a final freezing concentrating tank, as illustrated at 38 on the drawing and the liquor refrigerated by "Step Freeze" to −10° F. to form a molasses or syrup of approximately 70° to 75° Brix. If desired, this final freezing treatment may be carried out in several steps to produce a syrup of the desired consistency. A clear, light colored, sweet-tasting citrus molasses results.

The process of this invention permits the use of a high limed citrus waste liquor. In carrying out the process as described, from 0.5% to 1½% lime is added to the citrus mass as compared with the conventional limed citrus waste which ordinarily is strictly limited to the addition of between about 0.1% to 0.4% lime, based on the weight of the citrus waste. Higher amounts than this have been tried but have not been used heretofore because of the detrimental effect on the stock food, the waste of lime and the very serious damage to evaporators by lime scale.

The present process also avoids caramelizing of the citrus material during processing caused by the use of high temperatures such as generally employed during vacuum distillation. This disadvantage is overcome in the present process by utilizing successive graduated low-temperature treatment as described. Further, the use of higher limed citrus liquors in accordance with the present process, makes it possible to substantially increase the yield of d-limonene recovered. This is an important feature of this invention. The recovery of a high yield of d-limonene, as well as removal of naringin, hesperidin and hesperitin, when present, and other bitter tasting substances, is another important advantage attained by the present process.

As an alternative method of removing the bitter glucosides, particularly naringin, hesperidin, hesperitin, and the like compounds, use may be made of activated carbon (Darco S–51).

The liquor containing the glucoside to be removed is contacted with the active carbon for 15 to 30 minutes utilizing a mild agitation and at a temperature of about 60° C. This treatment of the liquor with activated carbon may also be employed in connection with the use of organic solvent extraction steps as described above.

The final citrus molasses product can be shipped in a frozen form, that is in refrigerator packed containers, if desired; or preserved without refrigeration where the molasses is sufficiently concentrated. The temperatures used in flash separation are usually sufficient to kill the bacteria and prevent spoilage by these organisms.

The process of the invention, as will be appreciated, eliminates the difficulty with precipitated scale-forming substances which results in scale formations on the heating surfaces of the concentrators, inasmuch as the concentration is done by utilizing a freezing dehydrating method step. The scale-forming salts in the press water, as is well known, have a greatly decreased solubility at elevated temperatures, particularly about 250° F. so that by eliminating the use of high temperature treatment equipment such as multiple evaporators, this difficulty with scale-forming salts is avoided. Moreover, the process provides a method of producing clear, light yellow colored citrus sweet-tasting, bland molasses as contrasted with the usual dark yellow or brown colored molasses which usually contains substantial amounts of the bitter tasting glucosides. By eliminating the melanoidmines (nitrogenations), there is no combination under heat of nitrogen and carbon to produce dark color and unpleasant flavor due to caramelization due to heat of vacuum distillation.

The process provides a method of removing the bitterness from the flavorones by solvent extraction.

The process produces d-limonene with improved optical characteristics for use as a citrus terpene utilized as a starting material for other synthetic products such as dyes, etc.

The process permits of low liming to secure the best stock food (below .5% of a percent) and permits of later high liming (.5 to 1.5%) in order to produce the maximum d-limonene from the press waters or peel oil, or both.

While the invention has been described in detail in connection with the processing of citrus waste as obtained from stock food plants, it is to be understood that the invention is not limited to this particular material, but is applicable for the treatment of equivalent wastes, e. g., beet and vegetable waste products, and that all such changes and modifications as come within the scope of the claims are embraced thereby.

What I claim is:

1. A process of producing citrus molasses of improved color and taste from citrus waste which comprises the steps of extracting unbound water from citrus waste by adding lime thereto and pressing the resultant mixture to remove unbound water and recover a press liquor comprising a mixture of unbound water and lime and flash evaporating the same to remove the citrus oils and d-limonene, subjecting the resultant liquor which is free of oils to settling action for separating the lime salts and the remaining unbound water-free of the citrus oils, thereafter dehydrating the resultant substantially salt free liquor by successive stages of freezing whereby the water is frozen out as ice crystals, separating the ice crystals after each freezing stage, and washing the resultant dehydrated concentrate with organic solvents to remove undesirable glucosides and produce a citrous molasses of improved taste and color.

2. A process of producing citrus molasses of improved color and taste from citrus waste which comprises the steps of extracting unbound water from citrus waste by adding lime thereto and pressing the resultant mixture to remove unbound water and recover a press liquor, heating the resultant press liquor comprising a mixture of unbound water and lime and flash evaporating the same to remove the citrus oils and d-limonene, subjecting the resultant liquor which is free of oils to settling action for separating the lime salts and the remaining unbound water free of the citrus oils, thereafter dehydrating the resultant substantially salt free liquor by successive stages of freezing whereby the water is frozen out as ice crystals, separating the ice crystals after each freezing stage, washing the resultant dehydrated concentrate with organic solvents to remove undesirable glucosides, and concentrating the resultant unbound water by subjecting the same to additional successive freezing stages to remove substantially all of the remaining water.

3. A process of producing citrus molasses of improved color and taste from citrus waste which comprises the steps of extracting unbound water from citrus waste by adding lime thereto and pressing the resultant mixture to remove unbound water and recover a press liquor, heating the resultant press liquor comprising a mixture of unbound water and lime and flash evaporating the same to remove the citrus oils and d-limonene, subjecting the resultant liquor which is free of oils to settling action for separating the lime salts and the remaining unbound water free of the citrus oils, thereafter dehydrating the resultant substantially salt free liquor by successive stages of freezing whereby the water is frozen out as ice crystals, separating the ice crystals after each freezing stage, washing the resultant dehydrated concentrate with organic solvents to remove undesirable glucosides, removing the bitter solids from the resultant unbound water by subjecting the same to additional freezing stages whereby substantially all of the water is removed, and separating the peel oils and de-limonene contained therein after flash evaporating of the same therefrom.

4. In a method of providing a bland, light colored citrus syrup from citrus waste, the step of liming and pressing said citrus waste to recover unbound water from the citrus fruit waste, the step of heating the unbound press water to approximately 150° to 160° F., the step of adding d-limonene thereto in an amount equal to approximately 2% based upon the weight of the citrus waste, the step of heating and precipitating the inorganic salts therefrom, the step of introducing up to 1½% of lime to the resultant unbound water liquor, the step of heating said lime and unbound water mixture to approximately 250° F., the step of spray drying the heated liquor to precipitate the calcium salts, the step of separating the unbound water from said calcium salts, the step of dehydrating the unbound water by successive freezing of the water into ice crystals and their removal from the mother liquor syrup, the step of de-bittering the syrup by treating with organic volatile solvents selected from the group consisting of higher alcohols and ketones to remove the bitter solids, the step of removing from the spray dry chamber the volatile oils and entrained d-limonene, and the step of separating the water therefrom by refrigeration and removal as ice crystals.

References Cited in the file of this patent

UNITED STATES PATENTS

| | | |
|---|---|---|
| 2,187,572 | Meinzer | Jan. 16, 1940 |
| 2,381,732 | Finley | Aug. 7, 1945 |
| 2,506,776 | Carnarius | May 9, 1950 |
| 2,510,797 | Burdick et al. | June 6, 1950 |
| 2,534,341 | Cross | Dec. 19, 1950 |
| 2,559,205 | Wenzelberger | July 3, 1951 |
| 2,563,705 | Burdick | Aug. 7, 1951 |
| 2,614,048 | Wenzelberger | Oct. 14, 1952 |
| 2,631,103 | Kermer | Mar. 10, 1953 |
| 2,666,707 | Beu | Jan. 19, 1954 |

OTHER REFERENCES

"Citrus Products," Braverman, 1949, page 46.